(12) United States Patent
Suzuki et al.

(10) Patent No.: US 6,536,932 B1
(45) Date of Patent: Mar. 25, 2003

(54) SPREAD ILLUMINATING APPARATUS WITH A FRAME HAVING RESILIENCE FOR CLAMPING CONSTITUENT MEMBERS

(75) Inventors: Shingo Suzuki, Iwata-gun (JP); Koichi Toyoda, Iwata-gun (JP)

(73) Assignee: Minebea Co., Ltd., Nagano (JP)

( * ) Notice: Subject to any disclaimer, the term of this patent is extended or adjusted under 35 U.S.C. 154(b) by 0 days.

(21) Appl. No.: 09/718,481

(22) Filed: Nov. 24, 2000

(30) Foreign Application Priority Data

Dec. 28, 1999 (JP) .......................................... 11-375191

(51) Int. Cl.$^7$ ............................................. G09F 13/00
(52) U.S. Cl. ..................... 362/560; 362/26; 362/27; 362/31
(58) Field of Search .......................... 362/26, 27, 31, 362/560, 561, 511; 385/133, 901

(56) References Cited

U.S. PATENT DOCUMENTS 3,610,914 A * 10/1971 Blackwell ................ 240/2.1
6,123,430 A * 9/2000 Ono et al. ................ 362/31
6,164,789 A * 12/2000 Unger et al. ............... 362/31

FOREIGN PATENT DOCUMENTS

JP 07-020460 A 1/1995

* cited by examiner

*Primary Examiner*—Sandra O'Shea
*Assistant Examiner*—Guiyoung Lee
(74) *Attorney, Agent, or Firm*—Oliff & Berridge, PLC

(57) ABSTRACT

A frame for use with a spread illuminating apparatus having a first facing plate, a second facing plate and a light reflecting portion. The frame being capable of covering and positioning a light source adjacent to an end of a transparent substrate by positioning the light source and the transparent substrate between the first and second facing plate. The frame futher including end portions of the first and second facing plates that are configured to resiliently clamp a portion of the transparent substrate. Productivity being improved and apparatus being made compact due to reduced number of parts and assembling processes. Uniformity of brightness and darkness being presented due to elimination of application of tape.

19 Claims, 5 Drawing Sheets

SPREAD ILLUMINATING APPARATUS WITH A FRAME HAVING RESILIENCE FOR CLAMPING CONSTITUENT MEMBERS

BACKGROUND OF THE INVENTION

1. Field of the Invention

The present invention relates to a spread illuminating apparatus for illuminating displays, such as signboards or various kinds of reflection type display apparatus, in particular liquid crystal displays.

2. Description of Related Art

Currently, due to a low power consumption, relative compactness and light weight, the demand for liquid crystal display apparatuses as displays for computers has increased. As opposed to a light emitting type element, such as a picture tube, the liquid crystal element of the liquid crystal display does not emit light itself, and therefore, the liquid crystal display needs to be illuminated in order to view a picture.

In order to illuminate the liquid crystal display while maintaining compactness, a thin plate-like side light type (light conductive member type) spread illuminating apparatus has been often used. An example of such a side light type of spread illuminating apparatus is shown in FIGS. 6 to 8.

FIG. 6 shows a spread illuminating apparatus 1 that includes a longitudinal light source 4 disposed close to one end face 3 of a transparent substrate 2 made of a light permeable material. The transparent substrate 2 is formed to have a wedge-shaped cross section in which the thickness of the transparent substrate 2 tapers from thick to thin as the distance from the one end face 3 is increased.

The light source 4 is formed in general with a long plate-like light conductive member 5 made of a light permeable material and disposed along and close to the one end face 3 of the transparent substrate 2 and a spot-like light source 6 disposed facing one end 5a of the light conductive member 5, and a reflection plate 7 is disposed on and facing the other end 5b of the light conductive member 5.

Additionally, a U-shaped light reflection member 9 is provided in such a manner as to partially cover the longitudinal circumferences of the longitudinal light conductive member 5. As shown in FIG. 6, the light reflection member 9 covers only a second face 5d, a third face 5e, and a fourth face 5f of the light conductive member 5. As shown in FIG. 8, the light reflection member 9 also covers a proximal portion 8 of the transparent substrate 2. Also, as shown in FIG. 8, between both facing portions 9a and 9b of the light reflection member 9 and the proximal portion 8 of the transparent substrate 2, double-faced tape 10 is interposed and adapted to fix the light reflection member 9 to the proximal portion 8.

On an upper surface 11a of the transparent substrate 2, a light reflection pattern 12 is formed. The light reflection pattern 12 is adapted to cause every portion of the transparent substrate 2 to have an approximately uniform brightness, regardless of the distance from the light conductive member 5.

In the conventional art indicated in FIGS. 6 to 8, the light reflection member 9 is fixed to the transparent substrate 2 by using the double-faced tape 10, and there have been the following problems often occurring.

First, at the time of fixing the light reflection member 9 to the transparent substrate 2, a process consuming time for adhering the light reflection member 9 to the transparent substrate 2 using the double-faced tape 10 is required, and to that extent, productivity is lowered.

Further, the apparatus as a whole becomes thicker due to the double-faced tape 10 interposed between the light reflection member 9 and the transparent substrate 2, as shown in FIG. 8. Additionally, because the double-faced tape 10 is applied on the proximal portion 8, where light enters the transparent substrate 2, nonuniformity in rightness at the time of viewing can be generated due to irregularity in applying the double-faced tape 10.

SUMMARY OF THE INVENTION

The present invention has been made in the light of the above circumstance and in order to provide a compact spread illuminating apparatus which can improve productivity and also prevent any nonuniformity of brightness in the illumination at the time of viewing.

According to a first aspect of the present invention, a spread illuminating apparatus is provided in which a bar-like light source is disposed close to an end face of a transparent substrate made of a light permeable material, wherein a frame comprising a light reflection member or having a light reflecting function, which is rigid and configured as having an approximately C-shaped or U-shaped cross-section, is disposed in such a manner that it covers the light source and extends as far as a proximal portion of the transparent substrate and that at least one of two facing plates thereof is provided with resilience working toward an opposing facing plate.

According to a second aspect of the present invention, a spread illuminating apparatus is provided in which a longitudinal light source is disposed close to an end face of a transparent substrate made of a light permeable material, wherein the light source is formed with a long plate-like light conductive member made of a light permeable material disposed along and close to at least one end face of the transparent substrate and a spot-like light source disposed close to one or both end faces of the light conductive member, and a frame comprising a light reflection member or having a light reflecting function, that is configured as having an approximately C-shaped or U-shaped cross section, is disposed in such a manner that it covers longitudinal surfaces of the light conductive member except a surface facing the transparent substrate and extends as far as a proximal portion of the transparent substrate, and that at least one of two facing plates hereof is provided with resilience working toward an opposing facing plate.

According to a third aspect of the present invention, resilience of the frame is obtained by pre-bending end portions of the facing plates of the frame toward each other.

According to a fourth aspect of the present invention, the pre-bending is carried out at a proximal portion of the facing plates.

According to a fifth aspect of the present invention, the pre-bending is carried out between the end portion and the proximal portion of the facing plates.

According to a sixth aspect of the present invention, the transparent substrate is tapered away from the one end to form a wedge-shape.

According to a seventh aspect of the present invention, the resilience of the frame is obtained by a projection formed on one or both of the facing plates in such a manner that the projection extends toward the opposing facing plate.

According to an eighth aspect of the present invention, the projection is formed as a cut-raised piece to be worked by a press working, and the projection is bent to be in parallel with the facing plate.

BRIEF DESCRIPTION OF THE DRAWINGS

The invention is described in detail with reference to the following figures, in which like elements are referred to with like numerals, and in which.

DETAILED DESCRIPTION OF PREFERRED EMBODIMENTS

A spread illuminating apparatus 1A in accordance with one embodiment of the present invention is explained with reference to FIGS. 1 to 4. Relevant portions and elements of the conventional art are referenced by the identical numbers and their explanations are omitted at discretion.

Figure 1:
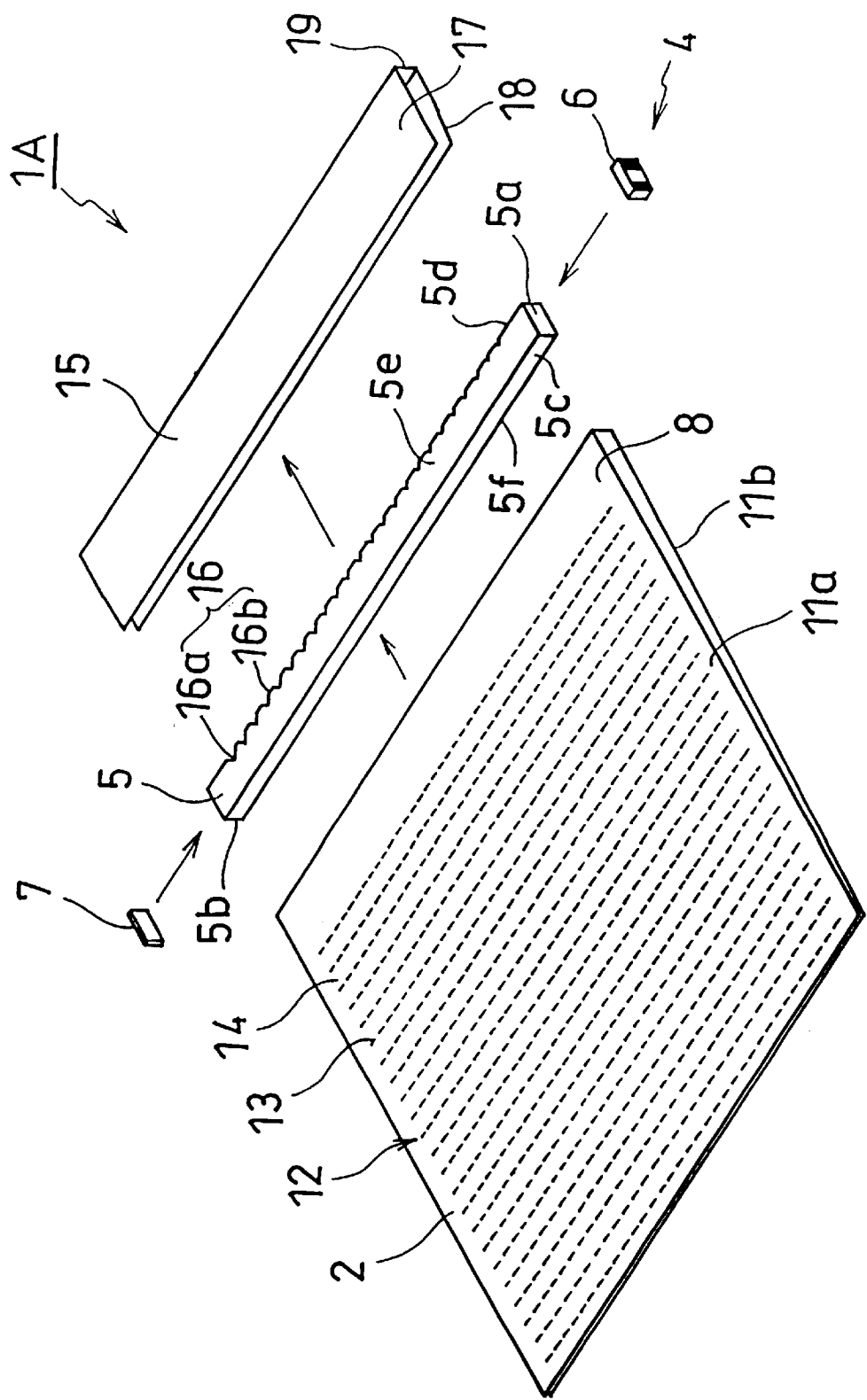
FIG. 1 is an exploded perspective view showing an embodiment of a spread illuminating apparatus in accordance with the present invention.

FIG. 1 shows a spread illuminating apparatus 1A that is formed in general with a longitudinal light source 4 disposed close to one end face 3 of a transparent substrate 2 that is made of a light permeable material. The spread illuminating apparatus may be disposed so as to cover a viewing screen, for example, of a reflection type liquid crystal element (not shown) to be used as an auxiliary illuminating means therefor.

As shown, the transparent substrate 2 is formed in a tapering manner so as to become thinner as the distance away from the end face 3 is increased. The tapering causes the transparent substrate to have a wedge-shaped configuration. On an upper face 11a of the transparent substrate 2, a light reflection pattern 12 is formed. The light reflection pattern 12 is formed with a plurality of grooves 13 that are configured approximately triangular in section and a plurality of plane portions 14 adjacent to the grooves 13. A ratio of the width (occupied area) of the groove 13 to the width (occupied area) of the plane portion 14 is configured so as to increase gradually as the distance away from the end face 3 of the transparent substrate 2 is increased. In this manner, the brightness of the transparent substrate 2 becomes approximately uniform at any portion on the transparent substrate 2 independently of the distance from a light conductive member 5. Furthermore, since the grooves 13 of the light reflection pattern 12 formed on the transparent substrate 2 are very fine, they are not visible to a human eye when viewing the screen.

The light source 4 is formed in general with a long plate-like light conductive member 5 made of a light permeable material and disposed along and close to one end face 3 of the transparent substrate 2 and a spot-like light source 6 formed with a light emitting diode disposed facing one end 5a of the light conductive member 5, and a light reflection plate 7 is disposed facing an opposite end 5b of the light conductive member 5.

The light reflection plate 7 can be a white (dispersion white foaming type) reflection plate or a reflection plate comprising a metal-vapored film. Alternatively, the light reflection plate 7 may be constituted by forming a metal layer or a coating layer directly on a surface of the other end 5b of the light conductive member S by vaporing metal (silver, aluminum, etc.) or applying paint.

Figure 2:
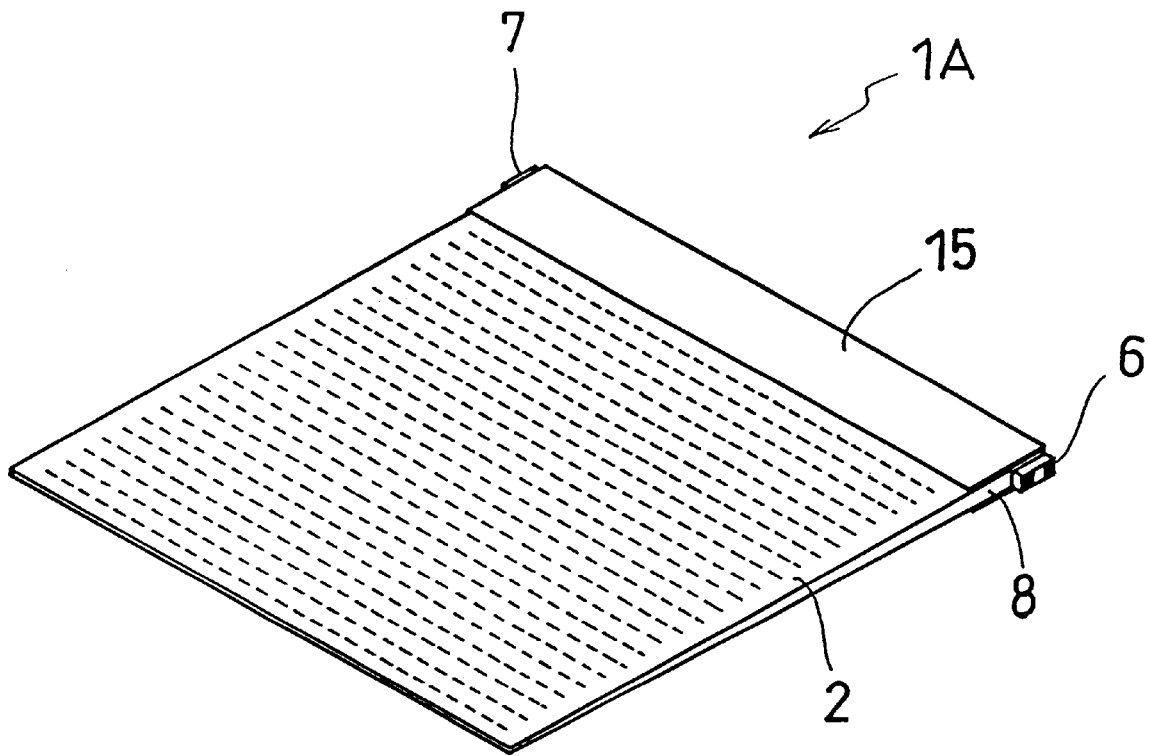
FIG. 2 is a perspective view showing a state of a frame of FIG. 1 assembled to a transparent substrate.

Furthermore, as shown in FIGS. 1 and 2, a frame 15 approximately C-shaped in cross section is provided that is adapted to partially cover longitudinal circumferential surfaces (i.e., a second surface 5d, a third surface 5e and a fourth surface 5f) of the light conductive member 5, not covering a first surface 5c of the light conductive member 5 facing the end face 3 of the transparent substrate 2. And, in an assembled state, the frame IS extends up to a proximal portion 8 corresponding to the thicker end of the transparent substrate 2.

An optical path conversion means 16 is provided on the second surface 5d of the light conductive member 5. The optical path conversion means 16 is formed with a groove 16a having a generally triangular configuration and a planar portion 16b located between the grooves 16a. By having this configuration, light that travels in the light conductive member 5 and is reflected on the second surface 5d is apt to travel, if it is reflected on the groove 16a, approximately perpendicular to the first surface 5c due to an inclined surface (not shown) forming the groove 16a. Accordingly, as compared to the case where light is reflected on the planar portion 16b, amount of light that is directed to eventually enter the transparent substrate 2 through the first surface 5c is increased.

Furthermore, a ratio of the width (occupied area) of the groove 16a to the width (occupied area) of the planar portion 16b is configured to increase gradually as the distance from the one end 5a of the light conductive member 5 is increased. Accordingly, by taking into consideration a balance between the distance from the spot-like light source 6 and the occupied area of the groove 16a, light can be emitted uniformly from the first surface 5c of the light conductive member 5 even when the spot-like light source 6 is disposed on the one end 5a.

The depth of the groove 16a is configured to gradually increase as the distance away from the spot-like light source 6 is increased while a spacing (pitch) of the optical path conversion means 16 of this embodiment is kept constant between the grooves 16a so that the ratio of the occupied area of the groove 16a to the occupied area of the planar portion 16b is varied as described above. Alternatively, the ratio of the occupied area of the groove 16a to the occupied area of the planar portion 16b may be varied by configuring the pitch between grooves 16a to narrow gradually while the depth of the groove 16a is kept constant.

The frame 15 can be constructed of a resilient metal member such as aluminum or stainless steel (for instance SUS 304) having rigidity and a given thickness (for instance 0.1 mm). As described above, the frame 15 also includes a mirror finished inner surface that performs the light reflecting function.

The frame 15 is formed in general with facing plates 17 and 18 (a facing plate facing the third surface 5e of the light conductive member 5 is referred to as a first facing plate 17 and a facing plate facing the fourth surface 5f of the light conductive member 5 is referred to as a second facing plate 18) and a frame body 19 that interconnects the first and second facing plates 17 and 18 respectively. As shown in FIG. 1, the first and second facing plates are approximately normal to the frame body 19, and can be further pre-bent toward each other to give the frame 15 additional resilience.

Figure 3:
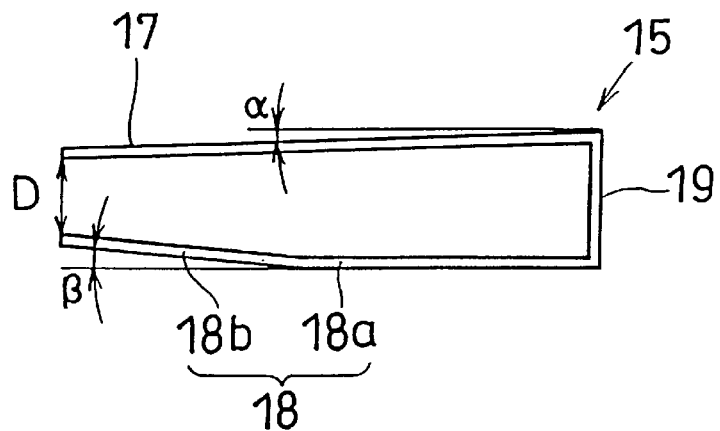
FIG. 3 is a side view showing the frame of FIG. 1.
Figure 4:
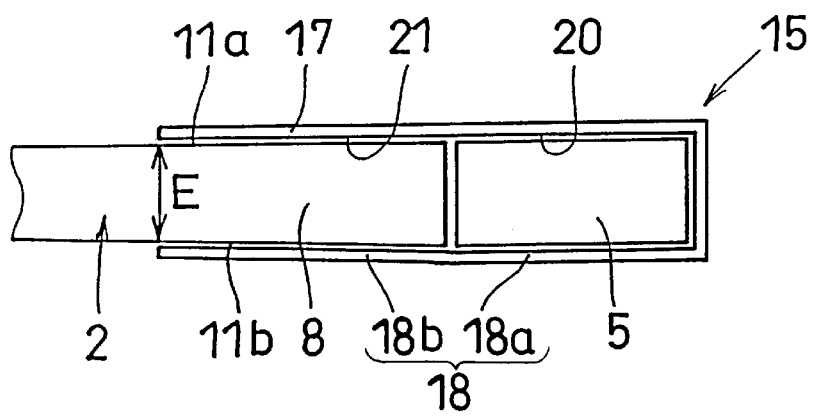
FIG. 4 is a side view showing schematically a state of the frame of FIG. 1 assembled to the transparent substrate.

For example, as shown in FIG. 3, the first facing plate 17 can be pre-bent toward the facing plate 18 by a given angle α (for instance 2 degrees) off normal to the frame body 19. Further, the second facing plate 18 is connected to the frame body 19 and is approximately normal to the frame body 19 at a proximal portion 18a, while an end portion 18b of the second facing plate 18, connected to the proximal portion 18a of the second facing plate 18, can be pre-bent toward the first facing plate 17 by a given angle β (for instance 5 degrees).

A longitudinal rectangular spacing portion (first spacing portion 20) is formed by the first facing plate 17, the frame body 19 and the proximal portion 18a of the second facing plate 18. A wedge-shaped spacing portion (second spacing portion 21) is formed by the first facing plate 17, the frame body 19 and the end portion 18b of the second facing plate 18. The light conductive member 5 is disposed in the first spacing portion 20, and the proximal portion 8 of the transparent substrate 2 is disposed in the second spacing portion 21.

As shown in FIG. 3, dimension D represents a distance from the end portion of the first facing plate 17 to the end portion of the second facing plate 18 of the frame 15, where the first and second facing plates 17, 18 are pre-bent toward each other. The dimension D is set to be smaller than dimension E shown in FIG. 5, which represents the thickness of the proximal portion 8 of the transparent substrate 2. When the frame 15 is positioned onto the proximal portion 8 of the transparent substrate 2, the end portions of the pre-bent first and second facing plates 17, 18 are forced to get displaced outward from initial state shown in FIG. 3. The outward displacement of the facing plates 17, 18 from the initial state causes the facing plates 17, 18 to be urged back to the initial state generating a restitutive force (resilience), thereby clamping the transparent substrate 2. In this state, the tip ends of the first and second facing plates 17, 18 are in contact with the transparent substrate 2 (it is to be understood that in FIG. 4, in order to make conspicuous the existence of the first and second facing plates, those plates 17, 18 are shown as being slightly separated from the transparent substrate 2).

When the frame 15 thus constructed is disposed in such a manner as to cover the light conductive member 5 and the proximal portion 8 of the transparent substrate 2, the tip ends of the first and second facing plates 17, 18 contact and clamp the upper face 11a and the lower face 11b of the transparent substrate 2 with the resilience. The frame 15 holds the transparent substrate 2 firmly with a clamping force due to the resilience, whereby the transparent substrate 2 and the frame 5 are fixed to each other.

Since the transparent substrate 2 is fixed to the frame 15 by the resilience of the frame 15 itself, number of parts required to construct the apparatus is reduced and a separate assembling process is no longer required, as compared to the conventional art in which a separate fixing means (double-faced tape 10) is used, and therefore productivity can be improved and the apparatus can be made compact. Additionally, since the transparent substrate 2 can be fixed to the frame 15 without inserting a separate member between a light reflection member 9 and the transparent substrate 2, the overall thickness of the apparatus is reduced as compared to the conventional art in which the double-faced tape 10 is provided between the light reflection member 9 and the transparent substrate 2, therefore the apparatus can be further compact.

Further, since no separate member is provided on the proximal portion 8, that is light incident side, of the transparent substrate 2, as opposed to the conventional art in which the double-faced tape 10 is placed on the proximal portion 8 of the transparent substrate 2, nonuniformity of brightness and darkness at the time of viewing the screen is not generated.

Furthermore, in this embodiment, the proximal portion 18a of the second facing plate 18 is pre-bent to be approximately normal to the frame body 19, and the end portion 18b of the second facing plate 18 is pre-bent to be inclined relative to the proximal portion 18a of the second facing plate 18. The longitudinal rectangular first spacing portion 20 is formed by the first facing plate 17, the frame body 19, and the proximal portion 18a of the second facing plate 18, in which the light conductive member 5 is disposed without leaving a significant clearance, and the wedge-shaped second spacing portion 21 is formed between the first facing plate 17, the frame body 19 and the end portion side 18b of the second facing plate 18, in which the proximal portion 8 of the transparent substrate 2 is disposed without leaving a significant clearance, whereby the apparatus can be made further compact to that extent.

Further, since the first facing plate 17 and the second facing plate 18 are formed by being pre-bent in such a manner as to be inclined so that both of the end portions thereof get closer to each other shaping a approximately wedge-like section while the transparent substrate 2 has a wedge-shape, the first facing plate 17 and the second facing plate 18 snugly clamp the proximal portion 8 of the transparent substrate 2, and thereby the transparent substrate 2 is fixed more firmly.

In this embodiment, the grooves 16a which form the optical path conversion means 16 are adapted to be configured approximately triangular in section, but it should be understood that the configuration of the grooves 16a is not limited to that but may also be approximately square or otherwise polygonal, and further the grooves 16 may be formed with curved surfaces similar to the inclined plane surfaces which form the groove 16a.

Further, the optical path conversion means 16 is described as comprising the planar portion 16b in the above embodiment, but it may be formed consecutively by a row of serrations (not shown) without the planar portion 16b, each of serrations being structured with two inclined surfaces which form a generally triangular section. In this case too, in order to realize uniform light emitting at the first surface 5c of the light conductive member 5, it is necessary to consider the inclination angle, dimension and spacing.

Although, the frame 15 itself has a light reflecting function in the above embodiment, a frame with a separate light reflection member having a light reflecting function may be provided with resilience as mentioned above. In this case, the material of the frame 15 is not limited to a metal but may also be any other stuff, such as a resin having a high enough rigidity.

Although a single spot-like light source 6 is provided in the above embodiment, it should be understood that a plurality of light sources can be used without departing from the spirit and scope of the present invention. And, although the spot-like light source 6 is faced to the one end 5a of the light conductive member 5 and the light reflection plate 7 is faced to the other end 5b of the light conductive member 5, another spot-like light source may be provided in place of the light reflection plate 7.

Further, although a light emitting diode is employed as the spot-like light source 6 in the above embodiment, it is to be understood that the spot-like light source 6 may be any kind of spot-like light source, for example an incandescent lamp, that can emit light at a comparatively low voltage.

The light conductive member 5 may be of any material that can pass light efficiently. From its light permeability and workability, an acrylic resin is most preferable. Alternatively, any thermoplastic transparent resin, such as vinyl chloride resin, polycarbonate resin, olefin resin, styrene resin, may be used. Furthermore, thermosetting transparent resin, such as epoxy resin, allyldiglicol carbonate resin, or inorganic transparent material, such as glass material of every kind, may be applicable depending on the occasion.

The light conductive member 5 can be produced by direct mechanical working such as cutting or grinding, or various molding methods such as casting, heat-pressure molding, protrusion molding or injection molding. From the viewpoint of the productivity, the injection molding using a resin material can be most preferable.

The optical path conversion means 16 is adapted to be formed merely on the second surface 5d of the light conductive member 5 in the above embodiment but may be additionally formed also on the other surfaces of the light conductive member 5 than the second surface 5d in order to cover a wider range.

The transparent substrate 2 is configured wedge-like in section in the above embodiment but may also be configured plate-like.

Further, while the frame 15 is configured as approximately C-shape in cross section in the above embodiment, the configuration of the frame 15 is not limited to that but may also be approximately U-shape, if necessary resilience can be obtained by pre-bending, etc.

Although both of the facing plates 17, 18 have resilience in the above embodiment, it should be understood that either one of them alone may be provided with resilience.

Although the light source 4, which is formed with the light conductive member 5 and the spot-like light source 6, is used in the above embodiment, alternatively, a bar-like light source lamp such as a cold cathode fluorescent lamp (CCFL) or a hot cathode fluorescent lamp (HCFL) may be used. The present invention may be applied to a spread illuminating apparatus in which such a lamp is disposed adjacent to one end of the transparent substrate 2. In this case, the frame 15 is disposed to cover the above mentioned light source and to extend up to the proximal portion 8 of the transparent substrate 2, and at least one of the two facing plates 17, 18 is given with resilience working toward the other. Additionally, since the transparent substrate 2 can be fixed to the frame 15 by the resilience of the frame 15 itself, productivity can be improved and the apparatus can be made further compact while the generation of the nonuniformity of light at the time of viewing is avoided in the similar manner as shown in the embodiment above mentioned.

Figure 5:
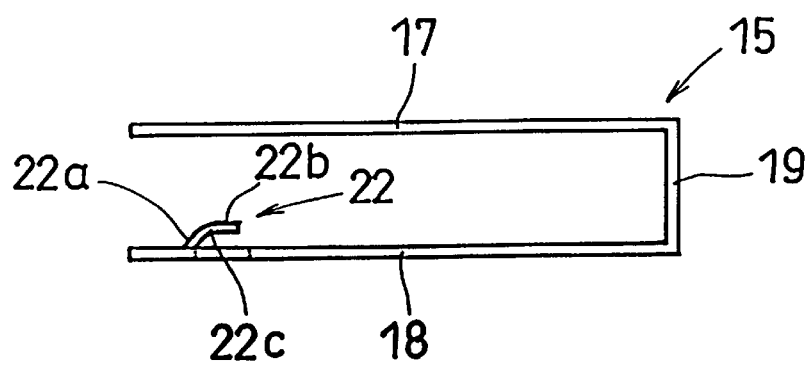
FIG. 5 is a side view showing an alternative embodiment of a spread illuminating apparatus of present invention.
Figure 6:
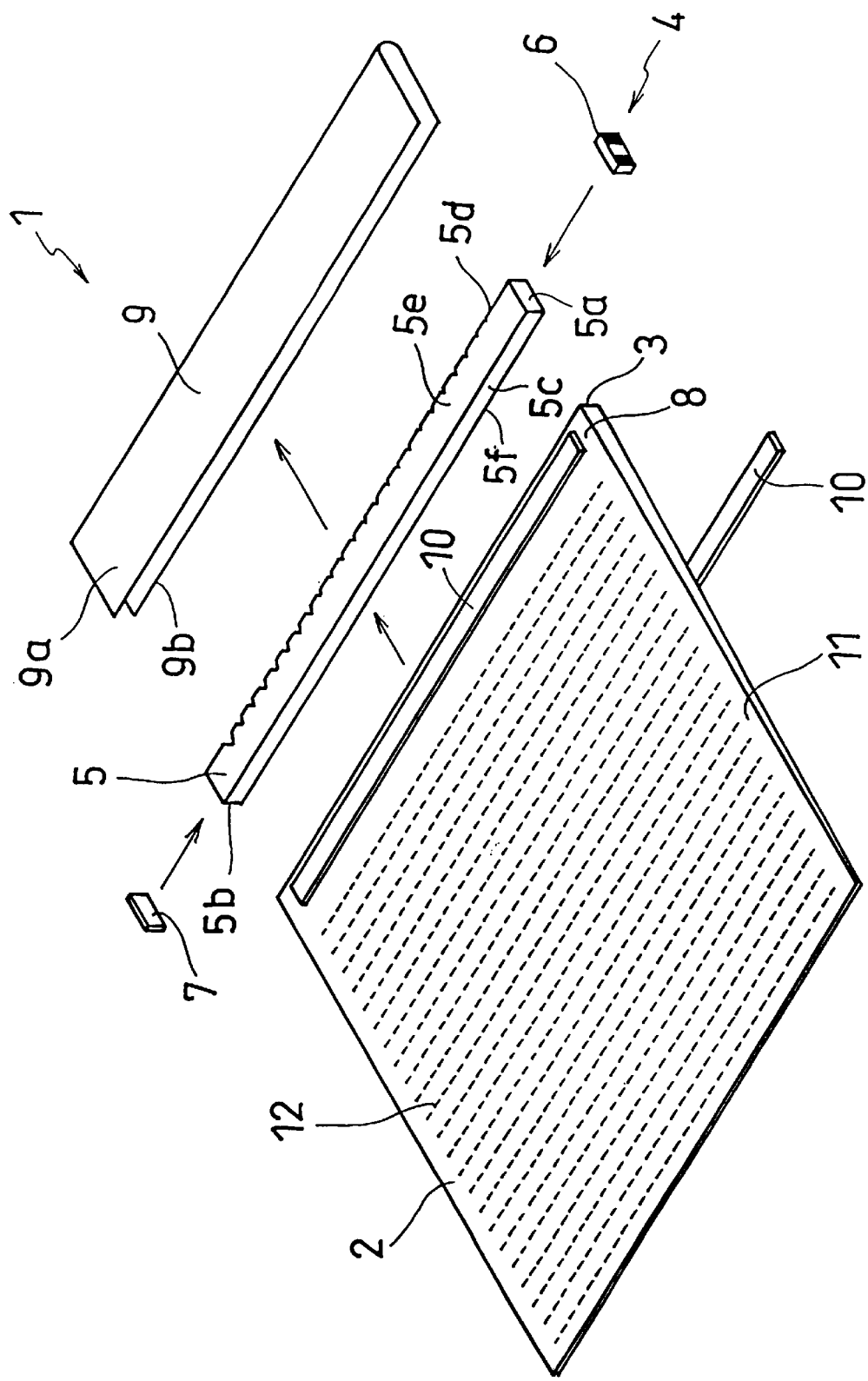
FIG. 6 is an exploded perspective view showing a conventional spread illuminating apparatus.
Figure 7:
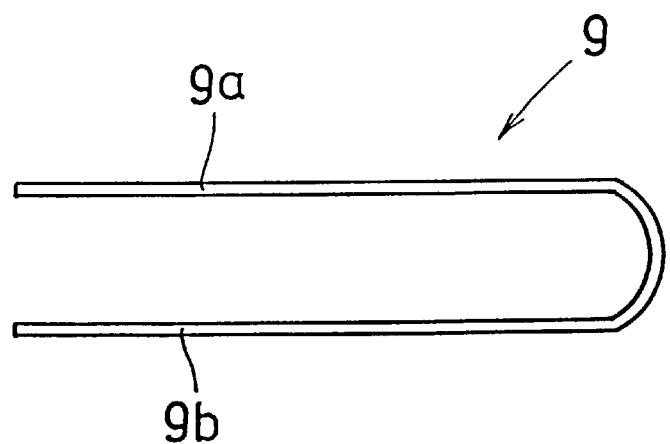
FIG. 7 is a side view showing a light reflecting member of FIG. 6.
Figure 8:
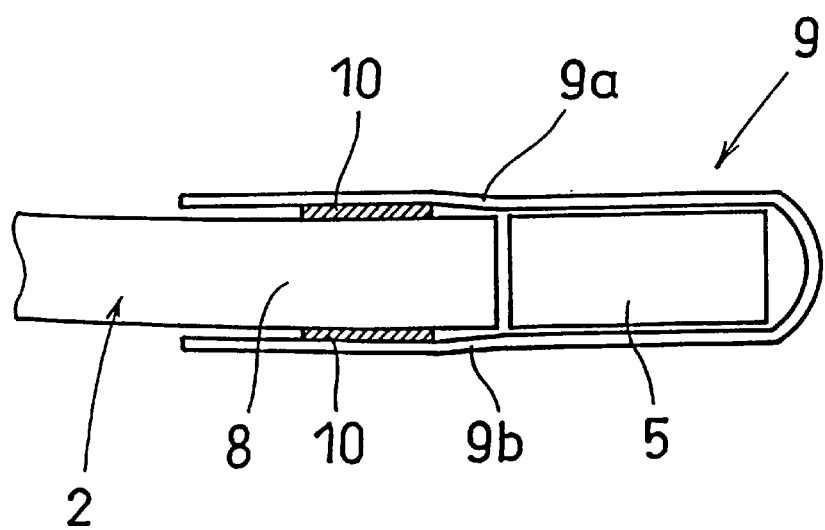
FIG. 8 is a side view showing schematically a state of the light reflecting member of FIG. 6 assembled to the transparent substrate.

In place of pre-bending the end portion 18b of the second facing plate 18 at a given angle relative to the proximal portion 18a thereof as mentioned above, the first and second facing plates 17, 18 may be formed approximately in parallel with each other and a cut-raised piece 22 structured as described below is provided on an intermediate portion of the second facing plate 18 as shown in FIG. 5, thereby generating resilience (an alternative embodiment).

The cut-raised piece 22 is approximately rectangular and is formed on the second facing plate 18 in such a manner that it is raised at a proximal end 22a and bent at an intermediate portion 22c so that a tip portion 22b is approximately parallel with the second facing plate 18. Accordingly, when the frame 15 is positioned to cover the light conductive member 5 and the proximal portion 8 of the transparent substrate 22, the cut-raised piece 22 is adapted to be pushed outward at the tip portion 22b. Since the second facing plate 18 is pushed outward by the cut-raised piece 22 in this state, a restitutive force (resilience) urging back to the initiated state is given to the second facing plate 18. Due to the pushing force by the resilience of the frame 15, the transparent substrate 2 can be fixed.

In this alternative embodiment, since the transparent substrate 2 is fixed to the frame 15 due to the resilience of the frame 15 itself as stated above, number of parts is reduced and taping process is eliminated as compared to the conventional art in which an extra fixing means, such as double-faced tape 10, is unnecessary. Therefore, productivity is improved and a compact apparatus can be realized.

Further, since the transparent substrate 2 can be fixed to the frame 15 without inserting any extra member between the light reflection member 9 and the transparent substrate 2, the apparatus as a whole can be structured thinner and can be further compact to that extent as compared to the above conventional art in which double-faced tape 10 is applied.

Although the cut-raised piece 22 is provided on the second facing plate 18 in the above embodiment, the cut-raised piece may be provided on the first facing plate 17 or both the first and second facing plates 17, 18. The cut-raised piece 22 is approximately rectangular in the above embodiment, however, it should be understood that the cut-raised piece 22 may be U-shaped with its tip portion rounded without departing from the spirit and scope of the present invention.

According to the first or second aspect of the present invention, by disposing the frame 15 in such a manner that it covers the light conductive member 5 and the proximal portion 8 of the transparent substrate 2, the proximal portion 8 of the transparent substrate 2 is pressed by the resilience of at least one of the facing plates 17, 18 of the frame 15 toward the other facing plate, whereby the transparent substrate 2 is fixedly held between the facing plates 17 and 18, thereby fixing the transparent substrate 2 to the frame 15. Since the transparent substrate 2 is fixed by the resilience of the frame 15 itself, number of parts is reduced and process of providing a fixing means is not required as compared to the conventional art in which a separate fixing means, such as double-faced tape, is provided. As a result, productivity can be improved and a compact apparatus can be realized. And, the apparatus as a whole can be structured thinner and can be further compact to that extent as compared to the conventional art in which separate members are inserted between the light reflection member 9 and the transparent substrate 2.

Further, as opposed to the conventional art in which double-faced tape 10 is applied to the proximal portion 8, that is light incident side, of the transparent substrate 2, no extra members are applied to the light incident side of the transparent substrate 2, therefore there is no generation of the nonuniformity of the brightness at the time of viewing.

According to the other aspects of the present invention, the resilience by the frame 15 itself can be generated without fail.

Further, according to another aspect of the present invention, since it is possible to match the bending configuration of the facing plates 17, 18 with the wedge-shaped configuration of the transparent substrate 2, the transparent substrate 2 can be clamped securely by the facing plates 17, 18. As a result, the transparent substrate 2 can be fixed more firmly.

While this invention has been described in conjunction with the specific embodiments thereof, it is evident that many alternatives, modifications, and variations will be apparent to those of ordinary skill in the art. Accordingly, preferred embodiments of the invention as set forth herein are intended to be illustrative, not limiting. These are changes that may be made without departing from the spirit and scope of the present invention.

What is claimed is:

1. A spread illuminating apparatus, in which a bar-like light source is disposed close to an end face of a transparent substrate made of a transparent material, wherein a frame, which comprises a frame body and two facing plates opposing each other where a first facing plate continuous with the frame body is pre-bent to be approximately perpendicular thereto, a second facing plate continuous with the frame body is pre-bent to be approximately perpendicular thereto, and the distal end portions thereof are pre-bent to be inclined relative to proximal portions, and which either includes a light reflection member or has a light reflecting function is rigidly structured, and wherein a first spacing portion rectangular in cross section in which the bar-like light source is disposed without leaving a significant clearance is formed by the frame body, the first facing plate and the proximal portion of the second facing plate, and a second spacing portion wedge-like in cross section in which the proximal portion of the transparent substrate is disposed without leaving a significant clearance is formed between the first facing plate and the distal end portion of the second facing plate.

2. The spread illuminating apparatus according to claim 1, wherein the transparent substrate is tapered in a direction away from the end of the transparent substrate to form a wedge-shape.

3. The spread illuminating apparatus according to claim 1, wherein the transparent substrate is tapered in a direction away from the end of the transparent substrate to form a wedge-shape.

4. A spread illuminating apparatus, in which a bar-like light source is disposed close to an end face of a transparent substrate made of a transparent material, wherein a frame, which comprises a frame body and two facing plates opposing each other where a first facing plate continuous with the frame body is pre-bent to be approximately perpendicular thereto, a second facing plate continuous with the frame body is pre-bent to be approximately perpendicular thereto, and the distal end portions thereof are pre-bent to be inclined relative to proximal portions, and which either includes a light reflection member or has a light reflecting function is rigidly structured, generally C-shaped in cross section and disposed in such a manner as to cover the bar-like light source and to extend as far as a proximal portion of the transparent substrate, and at least one of the two facing plates is given with resilience working toward the other facing plate, and wherein a first spacing portion rectangular in cross section in which the bar-like light source is disposed without leaving a significant clearance is formed by the frame body, the first facing plate and the proximal portion of the second facing plate, and a second spacing portion wedge-like in cross section in which the proximal portion of the transparent substrate is disposed without leaving a significant clearance is formed between the first facing plate and the distal end portion of the second facing plate; and wherein one or both of the facing plates include a projection extending toward the opposing facing plate.

5. The spread illuminating apparatus according to claim 4, wherein the projection is formed with a cut-raised work, and the projection is bent to be in a raised and parallel orientation relative to the facing plate on which the projection is formed.

6. The spread illuminating apparatus according to claim 4, wherein the transparent substrate is tapered in a direction away from the end of the transparent substrate to form a wedge-shape.

7. A spread illuminating apparatus, in which a bar-like light source comprising a long plate-like light conductive member made of a transparent material, disposed along and close to at least one end face of the transparent substrate and a spot-like light source disposed on at least one of both ends of the light conductive member is disposed close to an end face of a transparent substrate made of a transparent material, wherein a frame, which comprises a frame body and two facing plates opposing each other where a first facing plate continuous with the frame body is pre-bent to be approximately perpendicular thereto, a second facing plate continuous with the frame body is pre-bent to be approximately perpendicular thereto, and the distal end portions thereof are pre-bent to be inclined relative to proximal portions, and which either includes a light reflection member or has a light reflecting function is rigidly structured, generally C-shaped in cross section and disposed in such a manner as to cover longitudinal circumferential surfaces of the light conductive member except a surface facing the transparent substrate and to extend as far as a proximal portion of the transparent substrate, and at least one of the two facing plates is given with resilience working toward the other facing plate, and wherein a first spacing portion rectangular in cross section in which the bar-like light source is disposed without leaving a significant clearance is formed by the frame body, the first facing plate and the proximal portion of the second facing plate, and a second spacing portion wedge-like in cross section in which the proximal portion of the transparent substrate is disposed without leaving a significant clearance is formed between the first facing plate and the distal end portion of the second facing plate.

8. The spread illuminating apparatus according to claim 7, wherein first and second facing plates are bent so that end portions thereof oppose each other.

9. The spread illuminating apparatus according to claim 8, wherein the first and second facing plates are bent toward each other at a proximal portion of the first and second facing plates.

10. The spread illuminating apparatus according to claim 9 wherein the transparent substrate is tapered in a direction away from the end of the transparent substrate to form a wedge-shape.

11. The spread illuminating apparatus according to claim 8, wherein the bending of the first and second facing plates occurs in an intermediate area between the end portion and the proximal portion of the first and second facing plates.

12. The spread illuminating apparatus according to claim 11 wherein the transparent substrate is tapered in a direction away from the end of the transparent substrate to form a wedge-shape.

13. The spread illuminating apparatus according to claim 8, wherein the transparent substrate is tapered in a direction away from the end of the transparent substrate to form a wedge-shape.

14. The spread illuminating apparatus according to claim 7, wherein one or both of the facing plates include a projection extending toward the opposing facing plate.

15. The spread illuminating apparatus according to claim 14, wherein the projection is formed with a cut-raised work, and the projection is bent to be in a raised and parallel orientation relative to the facing plate on which the projection is formed.

16. A spread illuminating apparatus, in which a bar-like light source is disposed close to an end face of a transparent substrate made of a transparent material, wherein a frame that is rigid, generally C-shaped in cross section and either includes a light reflection member or has a light reflecting function is disposed in such a manner as to cover the bar-like light source without leaving a significant clearance and to extend as far as a proximal portion of the transparent substrate, and at least one of two facing plates of the frame is given with resilience working toward an opposing facing plate.

17. The spread illuminating apparatus according to claim 16, wherein the transparent substrate is tapered in a direction away from the end of the transparent substrate to form a wedge-shape.

18. A spread illuminating apparatus, in which a longitudinal light source is disposed close to an end face of a transparent substrate made of a transparent material, wherein the longitudinal light source is formed with a long plate-like light conductive member made of a transparent material disposed along and close to at least one end face of the transparent substrate and a spot-like light source disposed on at least one of both ends of the light conductive member, a frame that is rigid, generally C-shaped and either includes a light reflection member or has a light reflecting function and is disposed in such a manner as to cover longitudinal circumferential surfaces of the light conductive member except a surface facing the transparent substrate and to extend as far as a proximal portion of the transparent substrate, and at least one of two facing plates of the given frame is given with resilience working toward an opposing facing plate.

19. The spread illuminating apparatus according to claim 18, wherein the transparent substrate is tapered in a direction away from the end of the transparent substrate to form a wedge-shape.

* * * * *